United States Patent
Zhong

(10) Patent No.: US 11,944,211 B2
(45) Date of Patent: Apr. 2, 2024

(54) CHILD SEAT

(71) Applicant: Wonderland Switzerland AG, Steinhausen (CH)

(72) Inventor: Zhiren Zhong, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/137,777

(22) Filed: Apr. 21, 2023

(65) Prior Publication Data

US 2023/0255361 A1    Aug. 17, 2023

Related U.S. Application Data

(63) Continuation of application No. 17/881,841, filed on Aug. 5, 2022, now Pat. No. 11,696,649, which is a (Continued)

(30) Foreign Application Priority Data

Apr. 20, 2018    (CN) .......................... 201810360100.3

(51) Int. Cl.
*A47D 1/02* (2006.01)
*A47D 1/00* (2006.01)
(Continued)

(52) U.S. Cl.
CPC ............... *A47D 1/02* (2013.01); *A47D 1/002* (2013.01); *A47D 1/006* (2013.01); (Continued)

(58) Field of Classification Search
CPC .. B60R 2021/0044; A47D 1/02; A47D 1/002; A47D 1/006; B62B 9/102; B62B 9/104
See application file for complete search history.

(56) References Cited

U.S. PATENT DOCUMENTS

2012/0032418 A1\* 2/2012 Doucette ................. B62B 9/104
297/16.2
2019/0077436 A1    3/2019 Ruggiero et al.

FOREIGN PATENT DOCUMENTS

DE    102015102538    8/2016
WO    2019/054863    3/2019

OTHER PUBLICATIONS

Office Action in corresponding German patent application No. 102019110321.5 and English summary thereof dated Apr. 21, 2023.

\* cited by examiner

*Primary Examiner* — Syed A Islam

(74) *Attorney, Agent, or Firm* — NZ CARR LAW OFFICE

(57) ABSTRACT

A child seat includes a front guard and a backrest frame respectively connected pivotally with the seat portion about a first and a second pivot axis, and a folding mechanism including a latch pivotally connected with the seat portion about a third pivot axis for locking and unlocking the front guard with respect to the seat portion, and a linking part coupled to the latch and pivotally connected with the backrest frame about a fourth pivot axis. A rotation of the backrest frame from a deployed position toward a collapsed position causes a displacement of the linking part that urges the latch to unlock the front guard. The first, third, second and fourth pivot axes are arranged in that order along a direction from a front to a rear of the seat portion when the backrest frame is in the collapsed position and the front guard in a folded position.

20 Claims, 6 Drawing Sheets

Related U.S. Application Data continuation of application No. 17/113,774, filed on Dec. 7, 2020, now Pat. No. 11,439,250, which is a continuation of application No. 16/386,025, filed on Apr. 16, 2019, now Pat. No. 10,888,175.

(51) Int. Cl.
*B60R 21/00* (2006.01)
*B62B 9/10* (2006.01)

(52) U.S. Cl.
CPC ....... *B60R 2021/0044* (2013.01); *B62B 9/102* (2013.01); *B62B 9/104* (2013.01)

CHILD SEAT

CROSS-REFERENCE TO RELATED APPLICATION(S)

This application is a continuation of U.S. patent application Ser. No. 17/881,841 filed on Aug. 5, 2022, which is a continuation of U.S. patent application Ser. No. 17/113,774 filed on Dec. 7, 2020, now U.S. Pat. No. 11,439,250 B2, which is a continuation of U.S. patent application Ser. No. 16/386,025 filed on Apr. 16, 2019, now U.S. Pat. No. 10,888,175 B2, which claims priority to China patent application no. 201810360100.3 filed on Apr. 20, 2018.

BACKGROUND

1. Field of the Invention

The present invention relates to child seats.

2. Description of the Related Art

Various juvenile products are available on the market for facilitating care and transport of young children. For example, a child stroller may be typically used to transport a child outdoor. The child stroller generally has a seat portion, a backrest and a front guard. During use, the front guard can be erected to forwardly restrain a child sitting on the child stroller. When the child stroller is unused, the front guard and the backrest may be folded to reduce the size of the child stroller for convenient storage. Because the front guard and the backrest are separate elements, multiple operating steps are usually required for folding the front guard and the backrest, e.g., first unlocking and folding the front guard, and then unlocking and folding the backrest. This may undesirably complicate the folding of the child stroller.

Therefore, there is a need for an improved design that is more convenient to operate, and can address at least the foregoing issues.

SUMMARY

The present application describes a child seat that is convenient to fold for storage.

According to one one aspect, a child seat described herein includes a seat portion, a front guard extending above the seat portion and pivotally connected with the seat portion about a first pivot axis, the front guard being rotatable relative to the seat portion between an unfolded position and a folded position, a backrest frame pivotally connected with the seat portion about a second pivot axis for rotation between a deployed position and a collapsed position, and a folding mechanism including a latch pivotally connected with the seat portion about a third pivot axis, and a linking part coupled to the latch and pivotally connected with the backrest frame about a fourth pivot axis. The latch is rotatable relative to the seat portion and the front guard to lock and unlock the front guard with respect to the seat portion, and a rotation of the backrest frame from the deployed position toward the collapsed position causing a displacement of the linking part that urges the latch to unlock the front guard, wherein the first pivot axis, the third pivot axis, the second pivot axis and the fourth pivot axis are sequentially arranged in that order along a lengthwise direction from a front to a rear of the seat portion when the backrest frame is in the collapsed position and the front guard in the folded position.

According to another aspect, a child seat described herein includes a seat portion, a front guard extending above the seat portion and pivotally connected with the seat portion about a first pivot axis, the front guard being rotatable relative to the seat portion between an unfolded position and a folded position, a backrest frame pivotally connected with the seat portion about a second pivot axis for rotation between a deployed position and a collapsed position, and a folding mechanism including a latch pivotally connected with the seat portion about a third pivot axis, and a linking part coupled to the latch and pivotally connected with the backrest frame about a fourth pivot axis. The latch is rotatable relative to the seat portion and the front guard to lock and unlock the front guard with respect to the seat portion, and a rotation of the backrest frame from the deployed position toward the collapsed position causes a displacement of the linking part that urges the latch to unlock the front guard, wherein the first pivot axis and the second pivot axis are located higher than the third pivot axis relative to a bottom of the seat portion.

Yet according to another aspect, a child seat described herein includes a seat portion, a front guard extending above the seat portion and pivotally connected with the seat portion about a first pivot axis, the front guard being rotatable relative to the seat portion between an unfolded position and a folded position, a backrest frame pivotally connected with the seat portion about a second pivot axis for rotation between a deployed position and a collapsed position, and a folding mechanism including a latch pivotally connected with the seat portion about a third pivot axis, and a linking part coupled to the latch and pivotally connected with the backrest frame about a fourth pivot axis. The latch is rotatable relative to the seat portion and the front guard to lock and unlock the front guard with respect to the seat portion, and a rotation of the backrest frame from the deployed position toward the collapsed position causes a displacement of the linking part that urges the latch to unlock the front guard, wherein a rotation of the backrest frame about the second pivot axis angularly displaces the fourth pivot axis.

DETAILED DESCRIPTION OF THE EMBODIMENTS

Figure 1:
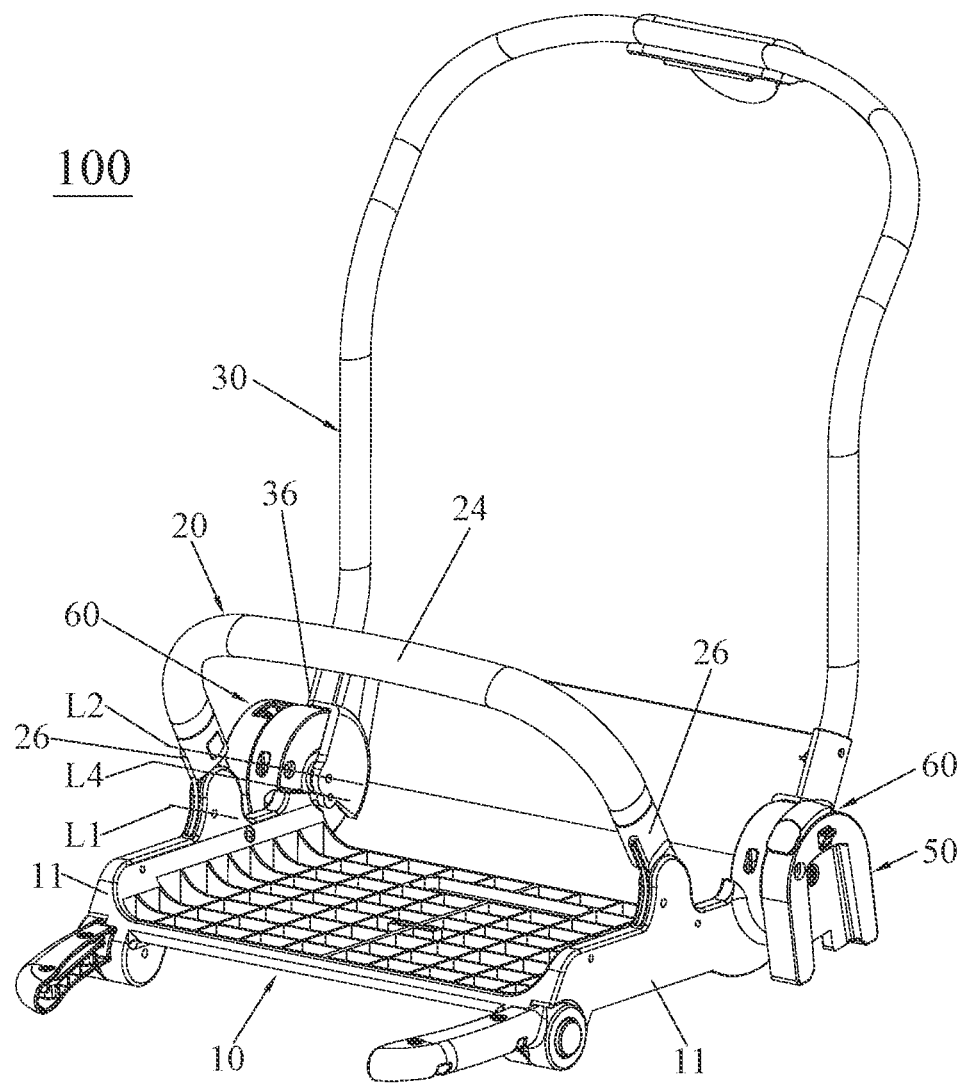
FIG. 1 is a perspective view illustrating an embodiment of a child seat.

Reference is made to FIGS. 1-5 to describe an embodiment of a child seat 100. Referring to FIGS. 1-5, the child seat 100 can include a seat portion 10, a front guard 20, a backrest frame 30 and a folding mechanism 40.

Figure 2:
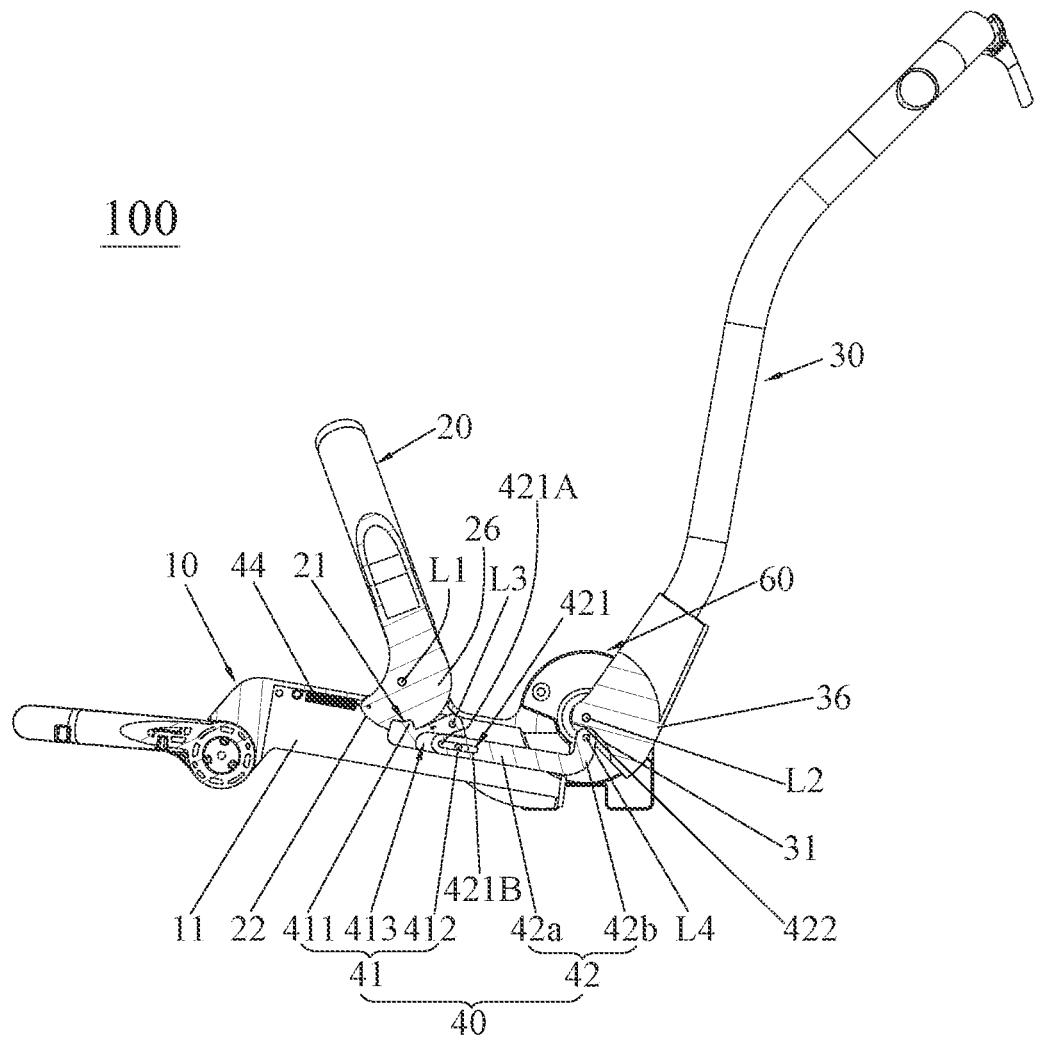
FIG. 2 is a cross-sectional view of the child seat shown in FIG. 1 taken along a vertical section plane.
Figure 3:
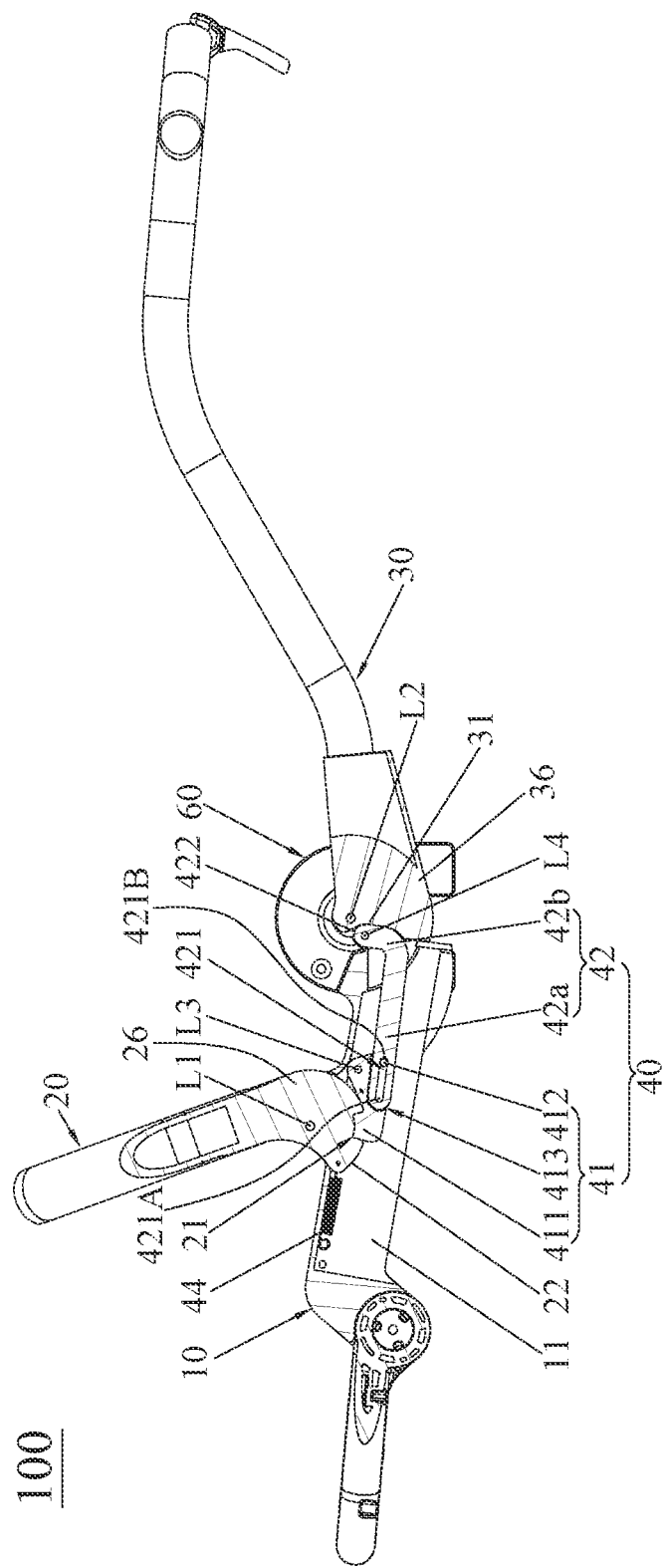
FIG. 3 is a cross-sectional view illustrating the child seat with a backrest frame disposed in another deployed position different from that shown in FIG. 2.
Figure 4A:
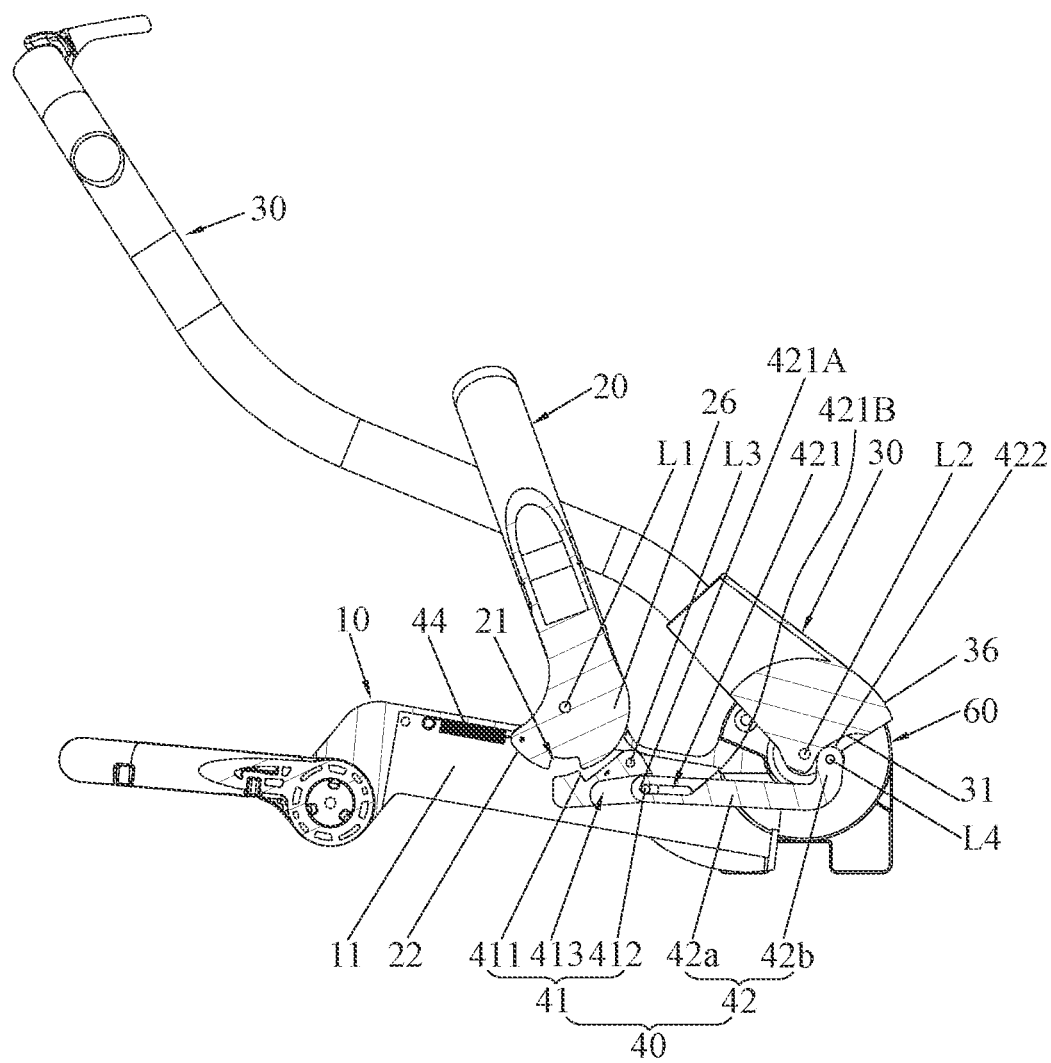
FIGS. 4a and 4b are two cross-sectional views illustrating exemplary operation for folding the backrest frame and a front guard of the child seat.
Figure 4B:
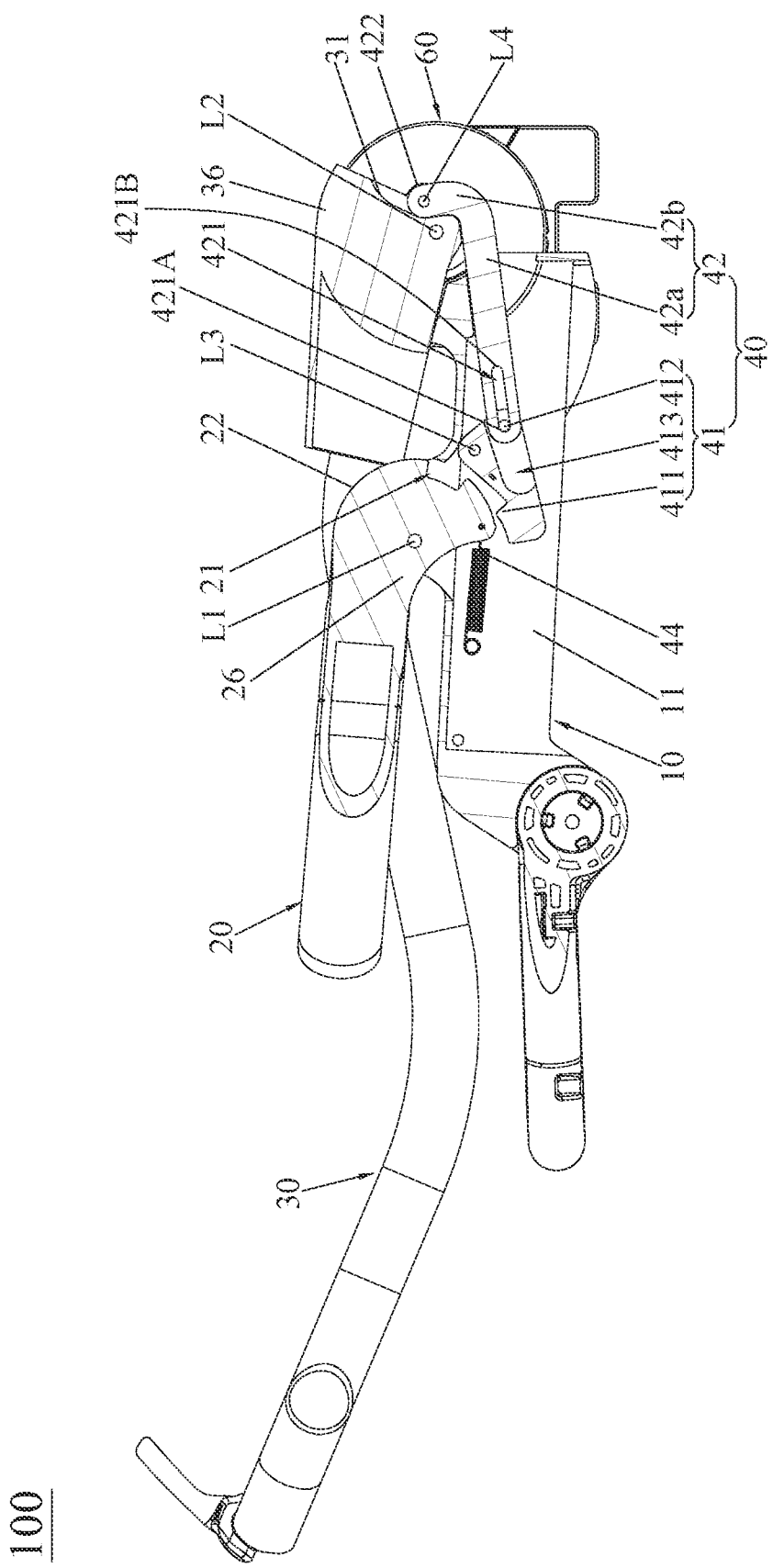

The front guard 20 can include a transversal portion 24, and two side end portions 26 respectively connected with the transversal portion 24 at a left and a right side thereof. The front guard 20 is pivotally connected with the seat portion 10 about a pivot axis L1 that generally extends transversally from a left side to a right side of the seat portion 10. The front guard 20 can thereby rotate about the pivot axis L1 relative to the seat portion 10 between multiple angular positions, which can include a folded position as shown in FIG. 4b and an unfolded position for use as shown in FIGS. 2 and 3. According to an example of construction, the seat portion 10 can have two sidewalls 11 respectively provided at the left and right sides, and the front guard 20 can be disposed so as to transversally extend above the seat portion 10 with the two side end portions 26 of the front guard 20 respectively connected pivotally with two sidewalls 11 about the pivot axis L1. The front guard 20 can be folded toward a front of the seat portion 10 in the folded position with the transversal portion 24 of the front guard 20 lying adjacent to the front of the seat portion 10. In the unfolded position, the transversal portion 24 of the front guard 20 can be positioned farther above the seat portion 10 so as to define a closed opening for placement of the child's legs between the seat portion 10 and the front guard 20.

The backrest frame 30 can include a transversal portion and two side end portions 36 respectively connected with the transversal portion at a left and a right side thereof. The backrest frame 30 is pivotally connected with the seat portion 10 about a pivot axis L2, and can rotate about the pivot axis L2 relative to the seat portion 10 for adjustment between multiple angular positions. According to an example of construction, the backrest frame 30 is disposed so as to transversally extend above the seat portion 10 with the two side end portions 36 of the backrest frame 30 respectively connected pivotally with the two sidewalls 11 of the seat portion 10 about the pivot axis L2. The pivot axis L2 extends transversally from the left side to the right side of the seat portion 10 parallel to the pivot axis L1, and is disposed behind the pivot axis L1 adjacent to a rear of the seat portion 10.

According to an embodiment, the backrest frame 30 is adjustable relative to the seat portion 10 between multiple angular positions including a collapsed position and one or more deployed position for use. FIG. 4b illustrates the collapsed position in which the backrest frame 30 can be folded toward the front of the seat portion 10. FIGS. 2 and 3 illustrate two exemplary deployed positions for use where the backrest frame 30 is positioned at two different angles relative to the seat portion 10. A first deployed position of the backrest frame 30 may correspond to a reclining position as shown in FIG. 3, and a second deployed position of the backrest frame 30 may correspond to an upright position between the first deployed position and the collapsed position as shown in FIG. 2. A backrest adjustment mechanism 60 may be provided to lock the backrest frame 30 in any one of the deployed positions.

Referring to FIG. 1, the two sidewalls 11 of the seat portion 10 can respectively have two connectors 50 operable to detachably engage with two corresponding structures provided on a standing frame of a child supporting apparatus (not shown). Examples of child supporting apparatuses that can receive the installation of the child seat 100 can include, without limitation, child strollers, highchairs, and the like. The child seat 100 can be thereby installed and removed as desired on the standing frame of a child supporting apparatus.

Referring to FIGS. 2-5, the folding mechanism 40 can include a latch 41, a linking part 42 and a spring 43. The latch 41 and the linking part 42 can be movably assembled with the seat portion 10. According to an embodiment, the latch 41, the linking part 42 and the spring 43 may be disposed and concealed inside one of the two sidewalls 11. The folding mechanism 40 can be thereby protected against undesirable damages or accidental actuation by a child sitting on the seat portion 10, and the outer appearance of the child seat 100 would not be affected.

The latch 41 is operable to lock and unlock the front guard 20 with respect to the seat portion 10. More specifically, the front guard 20 is locked in position relative to the seat portion 10 when the latch 41 is engaged with the front guard 20, and is unlocked for adjustment relative to the seat portion 10 when the latch 41 is disengaged from the front guard 20. For example, the latch 41 can engage with the front guard 20 for locking the front guard 20 in the unfolded position shown in FIGS. 2 and 3, and can disengage from the front guard 20 for adjustment of the front guard 20 between the unfolded position and the folded position shown in FIG. 4b. According to an example of construction, the latch 41 can be pivotally connected with the sidewall 11 of the seat portion 10 about a pivot axis L3, and can have a protrusion 411 that can engage with and disengage from a notch 21 provided on a peripheral edge 22 of the side end portion 26 of the front guard 20. The pivot axis L3 can extend transversally from the left side to the right side of the seat portion 10 parallel to the pivot axis L1, and the protrusion 411 can be provided at an offset location from the pivot axis L3. The protrusion 411 of the latch 41 can engage with the notch 21 of the side end portion 26 for locking the front guard 20 in position, and disengage from the notch 21 for unlocking the front guard 20.

It will be appreciated that the locking engagement between the latch 41 and the front guard 20 may also be achieved with a variant construction where a notch is provided on the latch 41 and a protrusion is provided on the side end portion 26 of the front guard 20 for engagement with the notch on the latch 41.

Figure 5:
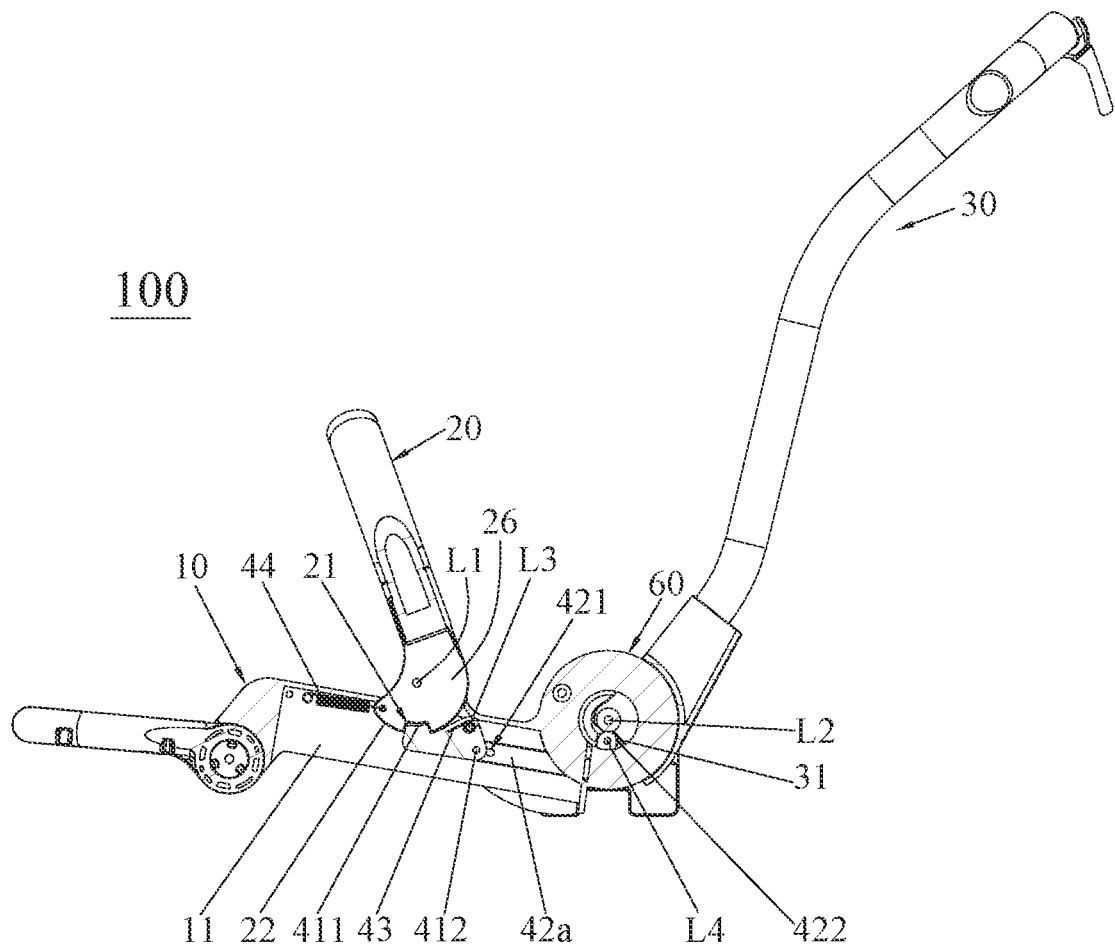
FIG. 5 is a cross-sectional view of the child seat taken along another vertical section plane different from that of FIG. 2.

Referring to FIG. 5, the spring 43 can be disposed between the seat portion 10 and the latch 41. The spring 43 can apply a biasing action that urges the latch 41 to engage with the front guard 20 for locking the front guard 20 in the unfolded position. While the front guard 20 is unlocked and rotates relative to the seat portion 10, the biasing action applied by the spring 43 on the latch 41 can cause the protrusion 411 of the latch 41 to remain in sliding contact with the peripheral edge 22 of the front guard 20. According to an example of construction, the spring 43 may be a torsion spring that is disposed around the pivot axis L3 of the latch 41 and has two opposite ends respectively connected with the latch 41 and the sidewall 11 of the seat portion 10.

Referring to FIGS. 1-5, the linking part 42 can be respectively coupled to the backrest frame 30 and the latch 41. More specifically, the linking part 42 can be movably coupled to the backrest frame 30 so that a rotation of the backrest frame 30 from a deployed position toward the collapsed position can urge the linking part 42 in movement and actuate the latch 41 against the biasing action of the spring 43 to disengage and unlock the front guard 20, as shown in FIG. 4a. Folding of the front guard 20 can be thereby facilitated. For example, a single operating step of rotating the backrest frame 30 to the collapsed position can unlock the front guard 20, and then cause the backrest frame 30 to contact and push the unlocked front guard 20 to rotate in unison in the same direction to its unfolded position.

According to an example of construction, the linking part 42 may be coupled to the backrest frame 30 with a pivotal connection, and coupled to the latch 41 with a sliding and pivotal connection. For example, the linking part 42 can include a rod portion 42a and an end portion 42b connected with each other, the end portion 42b bending and projecting at a side of the rod portion 42a. The linking part 42 comprised of the rod portion 42a and the end portion 42b may be formed integrally as a single part. The end portion 42b of the linking part 42 can be pivotally connected with the side end portion 36 of the backrest frame 30 about a pivot axis L4 that extends parallel to and spaced apart from the pivot axis L2 of the backrest frame 30 and the pivot axis L3 of the latch 41. The rod portion 42a of the linking part 42 can include an elongate slot 421 having two opposite ends 421A and 421B, and the latch 41 can have a pin 412 that is disposed through the elongate slot 421. The pin 412 may be disposed in a cavity 413 of the latch 41, and the rod portion 42a connected with the pin 412 may be at least partially received in the cavity 413.

Although the illustrated embodiment provides an exemplary construction for coupling the latch 41 to the linking part 42, other variant constructions may be suitable. For example, a variant construction can provide an elongate slot in the latch 41, and a pin may be fixedly connected with the linking part 42 and slidably disposed through the elongate slot to achieve a sliding and pivotal connection between the latch 41 and the linking part 42.

During adjustment of the backrest frame 30 relative to the seat portion 10, the linking part 42 can rotate relative to the backrest frame 30, the latch 41 and the linking part 42 can slide and rotate relative to each other. For example, when the backrest frame 30 rotates in a first direction from a deployed position toward the collapsed position, the linking part 42 can move along with the backrest frame 30 through the cavity 413 in a direction that reduces a distance between the pin 412 and the end 421A of the elongate slot 421 and increases a distance between the pin 412 and the other end 421B of the elongate slot 421. Conversely, when the backrest frame 30 rotates in a second direction opposite to the first direction (e.g., from the collapsed position toward a deployed position), the linking part 42 can move along with the backrest frame 30 through the cavity 413 in another direction that increases the distance between the pin 412 and the end 421A of the elongate slot 421 and reduces the distance between the pin 412 and the other end 421B of the elongate slot 421.

Because the front guard 20 may need to be kept in the unfolded position for use in any deployed position of the backrest frame 30, it may be desirable that the front guard 20 remains locked during adjustment of the backrest frame 30 between the deployed positions. According to an example of construction, the course of the pin 412 along the elongate slot 421 is configured to provide a range of travel for the linking part 42 that does not drive the latch 41 to move and unlock, which allows adjustment of the backrest frame 30 between the deployed positions while maintaining the front guard 20 in a locked state. As the backrest frame 30 rotates past the second deployed position shown in FIG. 2 and advances toward the collapsed position, the linking part 42 may move outside the aforementioned range of travel and urge the latch 41 to rotate and disengage from the front guard 20. More specifically, the linking part 42 moving along with the backrest frame 30 can cause the end 421A of the elongate slot 421 to contact with the pin 412 of the latch 41, and then urge the latch 41 to rotate for disengaging from the side end portion 26 of the front guard 20. The contact between the end 421A of the elongate slot 421 and the pin 412 of the latch 41 may occur when the backrest frame 30 rotating toward the collapsed position travels past an intermediate position between the second deployed position and the unfolded position of the front guard 20.

Accordingly, the folding mechanism 40 can keep the front guard 20 locked in the unfolded position for use while the backrest frame 30 is in the deployed positions or any intermediate position between the deployed positions, and can operate to unlock the front guard 20 only after the backrest frame 30 moves past the second deployed position of FIG. 2 toward the collapsed position.

Referring to FIGS. 2-5, the folding mechanism 40 can further include a spring 44 operable to bias the front guard 20 toward the unfolded position. Once the front guard 20 is unlocked, the biasing action applied by the spring 44 may facilitate movement of the unlocked front guard 20 from the folded position to the unfolded position. According to an example of construction, the spring 44 may be an extension spring that is disposed inside the sidewall 11 of the seat portion 10 and has two ends respectively connected with one side portion of the front guard 20 and the sidewall 11 of the seat portion 10.

Exemplary operation of the child seat 100 is described hereinafter with reference to FIGS. 1-5. Suppose that the child seat 100 is to be switched from a configuration where the backrest frame 30 is in the first deployed position and the front guard 20 is locked in the unfolded state as shown in FIG. 3 to another configuration where the backrest frame 30 is in the collapsed position and the front guard 20 in the folded position as shown in FIG. 4b. A caregiver can rotate the backrest frame 30 about the pivot axis L2 toward the front of the seat portion 10. As a result, the backrest frame 30 first rotates in a first direction from the first deployed position of FIG. 3 to the second deployed position of FIG. 2, which results in a relative movement between the linking part 42 and the latch 41 and causes a displacement of the pin 412 along the elongate slot 421 that reduces the distance between the pin 412 and the end 421A of the elongate slot 421 and increases the distance between the pin 412 and the other end 421B of the elongate slot 421. This relative movement between the linking part 42 and the latch 41 does not actuate the latch 41, which can remain engaged with the side end portion 26 to lock the front guard 20 in the unfolded position.

As the backrest frame 30 travels past the second deployed position and continues rotating in the first direction toward the collapsed state, the linking part 42 moving along with the backrest frame 30 can urge the latch 41 to rotate against the biasing action of the spring 43 for disengaging and unlocking the front guard 20 via a contact between the end 421A of the elongate slot 421 and the pin 412 of the latch 41. FIG. 4a illustrates the front guard 20 in an unlocked state while the backrest frame 30 is between the collapsed position and the second deployed position. The unlocked front guard 20 then can be rotated against the biasing action of the spring 44 from the unfolded position to the folded position, e.g., under a pushing action exerted by the backrest frame 30 on the front guard 20 as the backrest frame 30 continues to rotate toward the collapsed position. The front guard 20 and the backrest frame 30 can be thereby conveniently collapsed to the front of the seat portion 10 as shown in FIG. 4b, the front guard 20 remaining unlocked in the folded position. In the fully collapsed configuration of FIG. 4b, the pivot axes L1, L3, L2 and L4 can be sequentially arranged in that order along a lengthwise direction from a front to a rear of the seat portion 10.

When the child seat 100 is to be switched from the configuration of FIG. 4b to the configuration of FIG. 2, a caregiver can rotate the backrest frame 30 about the pivot axis L2 in a second direction opposite to the first direction toward the rear of the seat portion 10. While the backrest frame 30 rotates in the second direction from the collapsed position toward the second deployed position of FIG. 2, the front guard 20 can be rotated to the unfolded position. The biasing action applied by the spring 44 can assist in rotating the front guard 20 to the unfolded position. Once the front guard 20 reaches the unfolded position, the spring 43 can urge the latch 41 to engage and lock the front guard 20 in position.

In case the backrest frame 30 is adjusted rearward from the second deployed position of FIG. 2 to the first deployed position of FIG. 3, the linking part 42 can move relative to the latch 41 in a direction that increases the distance between the pin 412 and the end 421A of the elongate slot 421 and reduces the distance between the pin 412 and the other end 421B of the elongate slot 421, and the latch 41 can remain engaged with the front guard 20. The pin 412 may be exemplary positioned adjacent to the end 421B of the elongate slot 421 once the backrest frame 30 reaches the first deployed position. In the configuration of FIG. 3, the pivot axes L1, L3, L4 and L2 can be sequentially arranged in that order along a lengthwise direction from a front to a rear of the seat portion 10.

Referring to FIGS. 2-5, according to an example of construction, the end portion 42b of the linking part 42 can have an edge 422, and the side end portion 36 of the backrest frame 30 can have a limiting edge 31 that is adjacent to the edge 422 of the end portion 42b. The edge 422 of the end portion 42b may be a convex edge having a curved shape, and may face oppositely away from the rod portion 42b. The limiting edge 31 can be a concave edge having a curved shape. During rotation of the backrest frame 30 relative to the seat portion 10, the limiting edge 31 of the backrest frame 30 can remain adjacent to the edge 422 of the end portion 42b. For example, the edge 422 of the end portion 42b may be adjacent without contacting or in sliding contact with the limiting edge 31 of the backrest frame 30 during adjustment of the backrest frame 30 between the deployed positions. The limiting edge 31 may prevent an undesirable displacement of the linking part 42 that is not induced by a rotation of the backrest frame 30, e.g., while the backrest frame 30 is held in any of the deployed positions. The linking part 42 can be thereby restrictedly positioned to prevent accidental unlocking of the latch 41 when the backrest frame 30 is adjusted to any of the deployed positions, which can assist in keeping the front guard 20 locked in the unfolded position.

In the aforementioned embodiment, the front guard 20 can be locked in the unfolded position with the latch 41 and unlocked by rotating the backrest frame 30 toward the collapsed position. According to a variant embodiment, the placement of the latch 41 and the linking part 42 may be interchanged so that the backrest frame 30 may be locked in a deployed position with the latch 41 and unlocked by rotating the front guard 20 toward the folded position. In this variant embodiment, the latch 41 can rotate to engage and disengage the side end portion 36 of the backrest frame 30 for locking and unlocking the backrest frame 30, and the linking part 42 may be respectively coupled to the front guard 20 with a pivotal connection and to the latch 41 with a sliding and pivotal connection like previously described. The linking part 42 can be thereby movably coupled to the front guard 20 so that a rotation of the front guard 20 from the unfolded position toward the folded position can urge the linking part 42 in movement and actuate the latch 41 to disengage and unlock the backrest frame 30 for its convenient collapsing toward the front of the seat portion 10.

According to another variant construction, the latch 41 may be slidably connected with the seat portion 10 so as to be movable for engaging one of the front guard 20 and the backrest frame 30, and the linking part 42 may be a flexible element (such as a cable or a cord) respectively connected with the latch 41 and the other one of the front guard 20 and the backrest frame 30. As the element (i.e., either the front guard 20 or the backrest frame 30) coupled to the flexible element rotates in the folding direction, the flexible element can pull and actuate the latch 41 to disengage and unlock the other one of the front guard 20 and the backrest frame 30.

Advantages of the structures described herein include the ability to conveniently fold a backrest frame and a front guard of a child seat. The child seat can have a latch and a linking part connected with each other, the latch being operable to lock one of the backrest frame and the front guard in position, and the other one of the backrest frame and the front guard being movable to drive the latch to unlock for folding of the backrest frame and the front guard. In particular, an embodiment may have the latch operable to lock the front guard, and the linking part may be coupled to the latch and the backrest frame so that a rotation of the backrest frame toward the collapsed position can actuate the latch to disengage and unlock the front guard. As a result, the backrest frame and the front guard can be folded with a reduced number of operating steps.

Realization of the child seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child seat comprising:
    a seat portion;
    a front guard extending above the seat portion and pivotally connected with the seat portion about a first pivot axis, the front guard being rotatable relative to the seat portion between an unfolded position and a folded position;
    a backrest frame pivotally connected with the seat portion about a second pivot axis for rotation between a deployed position and a collapsed position; and
    a folding mechanism including a latch pivotally connected with the seat portion about a third pivot axis, and a linking part coupled to the latch and pivotally connected with the backrest frame about a fourth pivot axis, the latch being rotatable relative to the seat portion and the front guard to lock and unlock the front guard with respect to the seat portion, and a rotation of the backrest frame from the deployed position toward the collapsed position causing a displacement of the linking part that urges the latch to unlock the front guard;
    wherein the first pivot axis, the third pivot axis, the second pivot axis and the fourth pivot axis are sequentially arranged in that order along a lengthwise direction from a front to a rear of the seat portion when the backrest frame is in the collapsed position and the front guard in the folded position.

2. The child seat according to claim 1, wherein the front guard has a side end portion that is pivotally connected with the seat portion about the first pivot axis and has a peripheral edge provided with a notch, the latch being rotatable to engage and disengage the notch on the peripheral edge of the side end portion.

3. The child seat according to claim 1, wherein the folding mechanism further includes a spring connected with the latch, the spring applying a biasing force for urging the latch to engage with the front guard, and a rotation of the backrest frame from the deployed position toward the collapsed position causing a displacement of the linking part that urges the latch to rotate against the biasing force of the spring for unlocking the front guard.

4. The child seat according to claim 1, wherein the linking part is slidably connected with the latch.

5. The child seat according to claim 4, wherein one of the linking part and the latch includes an elongate slot, and the other one of the linking part and the latch has a pin disposed through the elongate slot, a course of the pin along the elongate slot is configured to provide a range of travel for the linking part that does not cause the latch to unlock the front guard.

6. The child seat according to claim 5, wherein the linking part is movable to urge the latch to unlock the front guard via a contact between the pin and one end of the elongate slot.

7. The child seat according to claim 5, wherein the pin is disposed in a cavity of the latch, and the linking part is at least partially received in the cavity of the latch.

8. The child seat according to claim 1, wherein the seat portion has a connector operable to detachably engage with a corresponding structure provided on a standing frame of a child supporting apparatus.

9. A child seat comprising:
a seat portion;
a front guard extending above the seat portion and pivotally connected with the seat portion about a first pivot axis, the front guard being rotatable relative to the seat portion between an unfolded position and a folded position;
a backrest frame pivotally connected with the seat portion about a second pivot axis for rotation between a deployed position and a collapsed position; and
a folding mechanism including a latch pivotally connected with the seat portion about a third pivot axis, and a linking part coupled to the latch and pivotally connected with the backrest frame about a fourth pivot axis, the latch being rotatable relative to the seat portion and the front guard to lock and unlock the front guard with respect to the seat portion, and a rotation of the backrest frame from the deployed position toward the collapsed position causing a displacement of the linking part that urges the latch to unlock the front guard;
wherein the first pivot axis and the second pivot axis are located higher than the third pivot axis relative to a bottom of the seat portion.

10. The child seat according to claim 9, wherein the first pivot axis, the third pivot axis, the second pivot axis and the fourth pivot axis are sequentially arranged in that order along a lengthwise direction from a front to a rear of the seat portion when the backrest frame is in the collapsed position and the front guard in the folded position.

11. The child seat according to claim 9, wherein the front guard has a side end portion that is pivotally connected with the seat portion about the first pivot axis and has a peripheral edge provided with a notch, the latch being rotatable to engage and disengage the notch on the peripheral edge of the side end portion.

12. The child seat according to claim 9, wherein a rotation of the backrest frame about the second pivot axis angularly displaces the fourth pivot axis.

13. The child seat according to claim 9, wherein the linking part is slidably connected with the latch.

14. The child seat according to claim 13, wherein one of the linking part and the latch includes an elongate slot, and the other one of the linking part and the latch has a pin disposed through the elongate slot, a course of the pin along the elongate slot is configured to provide a range of travel for the linking part that does not cause the latch to unlock the front guard.

15. The child seat according to claim 14, wherein the linking part is movable to urge the latch to unlock the front guard via a contact between the pin and one end of the elongate slot.

16. A child seat comprising:
a seat portion;
a front guard extending above the seat portion and pivotally connected with the seat portion about a first pivot axis, the front guard being rotatable relative to the seat portion between an unfolded position and a folded position;
a backrest frame pivotally connected with the seat portion about a second pivot axis for rotation between a deployed position and a collapsed position; and
a folding mechanism including a latch pivotally connected with the seat portion about a third pivot axis, and a linking part coupled to the latch and pivotally connected with the backrest frame about a fourth pivot axis, the latch being rotatable relative to the seat portion and the front guard to lock and unlock the front guard with respect to the seat portion, and a rotation of the backrest frame from the deployed position toward the collapsed position causing a displacement of the linking part that urges the latch to unlock the front guard;
wherein a rotation of the backrest frame about the second pivot axis angularly displaces the fourth pivot axis.

17. The child seat according to claim 16, wherein the first pivot axis, the third pivot axis, the second pivot axis and the fourth pivot axis are sequentially arranged in that order along a lengthwise direction from a front to a rear of the seat portion when the backrest frame is in the collapsed position and the front guard in the folded position.

18. The child seat according to claim 16, wherein the front guard has a side end portion that is pivotally connected with the seat portion about the first pivot axis and has a peripheral edge provided with a notch, the latch being rotatable to engage and disengage the notch on the peripheral edge of the side end portion.

19. The child seat according to claim 16, wherein one of the linking part and the latch includes an elongate slot, and the other one of the linking part and the latch has a pin disposed through the elongate slot, a course of the pin along the elongate slot is configured to provide a range of travel for the linking part that does not cause the latch to unlock the front guard.

20. The child seat according to claim 19, wherein the linking part is movable to urge the latch to unlock the front guard via a contact between the pin and one end of the elongate slot.

* * * * *